United States Patent
Bent et al.

(10) Patent No.: US 9,944,473 B2
(45) Date of Patent: Apr. 17, 2018

(54) PROTECTIVE WEAR COVER FOR METERING UNIT

(71) Applicant: CNH Industrial Canada, Ltd., Saskatoon (CA)

(72) Inventors: Ethan Curtis Stephen Bent, Saskatoon (CA); Martin J. Roberge, Saskatoon (CA); Dennis George Thompson, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 100 days.

(21) Appl. No.: 15/195,256

(22) Filed: Jun. 28, 2016

(65) Prior Publication Data

US 2017/0369257 A1    Dec. 28, 2017

(51) Int. Cl.
  *B65G 53/08* (2006.01)
  *B65G 53/34* (2006.01)
  *B65G 53/06* (2006.01)
  *A01C 14/00* (2006.01)

(52) U.S. Cl.
  CPC .............. *B65G 53/34* (2013.01); *A01C 14/00* (2013.01); *B65G 53/06* (2013.01); *B65G 2207/48* (2013.01)

(58) Field of Classification Search
  CPC ............. B65B 53/08; A01C 7/082; B60P 1/60
  USPC .................. 406/52, 127, 130, 144, 181, 183
  See application file for complete search history.

(56) References Cited

U.S. PATENT DOCUMENTS

| | | | | |
|---|---|---|---|---|
| 4,010,097 A | * | 3/1977 | Murray | B07B 4/02 209/139.1 |
| 4,451,184 A | * | 5/1984 | Mitchell | C10J 3/485 201/31 |
| 6,170,768 B1 | * | 1/2001 | Harmon | B65G 53/14 241/39 |
| 8,434,416 B2 | * | 5/2013 | Kowalchuk | A01C 7/126 111/178 |
| 9,351,441 B2 | * | 5/2016 | Kowalchuk | A01C 7/126 |
| 9,363,942 B2 | * | 6/2016 | Bent | A01C 7/081 |
| 9,392,741 B2 | * | 7/2016 | Kowalchuk | A01C 7/126 |
| 9,462,743 B2 | * | 10/2016 | Kowalchuk | A01C 7/126 |
| 9,615,505 B2 | * | 4/2017 | Bent | A01C 7/081 |
| 2014/0261810 A1 | | 9/2014 | Bent et al. | |
| 2015/0359165 A1 | | 12/2015 | Roberge et al. | |

* cited by examiner

*Primary Examiner* — Joseph A Dillon, Jr.
(74) *Attorney, Agent, or Firm* — Rebecca L. Henkel; Rickard K. DeMille

(57) ABSTRACT

The present invention provides a protective wear cover which may be utilized in a metering device housing to protect the housing in an area which may be subjected to high impact by product flow. The protective wear cover may be installed inside the metering device housing at the venturi induction zone. The protective wear cover may be manufactured from a highly wear resistant material. The shape of the protective wear cover may be suited to conform to the metering device housing in the protected area to ensure a tight fit and negligible effect on air flow. This protective wear cover may therefore serve as a sacrificial barrier which prevents wear on the metering device housing and may be periodically replaced when worn. Replacing the protective wear cover negates the need to replace the whole metering device housing.

20 Claims, 6 Drawing Sheets

PROTECTIVE WEAR COVER FOR METERING UNIT

FIELD OF THE INVENTION

The present invention relates to farm implements and, more particularly, to a protective wear cover for an agricultural product meter box for protecting the housing of the meter box from the high impact of product such as seed, fertilizer, herbicide or insecticide flowing in an air stream.

BACKGROUND OF THE INVENTION

Air seeder systems include a traction unit with an air cart in tow and frequently include a third unit such as a planter or cultivator either intermediate the traction unit and air cart or towed behind the air cart. Agricultural implements that employ an air seeder system to apply seed, fertilizer, or other particulate matter to the surface of a farm field typically have a material supply source such as one or more central hoppers or tanks that are loaded with the particulate matter. The hoppers have or are associated with a metering device, which is typically a rotating element, that meters the particulate matter from the hoppers into a set of distribution channels, such as conduits, hoses, etc., that are flow coupled to the individual row units, or seed boxes associated with the individual row units. In many implementations, a pneumatic source such as a blower system provides a turbulent air stream into which the particulate matter is entrained to pass the particulate matter through the distribution channels and ultimately to the individual row units.

In some air seeder systems, agricultural product from the hopper passes through the metering device and then down a drop chute to a venturi region for travel through one or more product conveyance tubes. As product flows through the venturi region, product may oftentimes make contact with a corner feature of the metering device at high velocity. Over time, this could potentially cause a hole to wear through the metering device, particularly if frequently using larger, denser product, such as phosphorus fertilizer or rice. As a result, costly and time consuming repair could become necessary.

SUMMARY OF THE INVENTION

The present inventors have determined that a protective wear cover may be utilized in a metering device housing to protect the housing in an area which may be subjected to high impact by product flow. The protective wear cover may be installed, inside the metering device housing at the venturi induction zone. The protective wear cover may be manufactured from a highly wear resistant material. The shape of the protective wear cover may be suited to conform to the metering device housing in the protected area to ensure a tight fit and negligible effect on air flow. This protective wear cover may therefore serve as a sacrificial barrier which prevents wear on the metering device housing and may be periodically replaced when worn. Replacing the protective wear cover negates the need to replace the whole metering device housing.

The protective wear cover may be manufactured from a wear resistant, softer and more flexible material than the metering device housing. This may allow providing cushioning for the product upon impact, which may thereby reduce the likelihood of damage, breakage and/or scarring of product prior to delivery to the ground.

In one aspect, the protective wear cover could be installed from the outside of the metering device housing. The protective wear cover could form a structural part of the metering device housing. The protective wear cover could be secured to the metering device housing with a screw allowing for the possibility of replacement in the field with simple tools such as a screw driver.

Specifically then, one aspect of the present invention provides a pneumatic agricultural product delivery system, including: at least one product supply hopper; a pneumatic source; at least one product conveyance tube receiving air flow from the pneumatic source for supplying air entrained product to a utilization implement; a metering device for supplying product from the supply hopper to a product conveyance tube; an elongated drop chute of generally rectangular cross-sectional configuration having a front wall, a rear wall, and first and second sidewalls extending downwardly from the metering device to the product conveyance tube, the drop chute cross-sectional configuration having a varying width between the first and second sidewalls beginning near the metering device and diminishing to an intermediate lesser width which continues downwardly to an abrupt increase in width near the product conveyance tube, the abrupt increase followed by a gradual further increase in width formed by an arcuate region extending downwardly and terminating adjacent to the product delivery tube; and a protective wear cover in contact with an interior portion of the elongated drop chute.

In another aspect, the present invention provides an air cart having a pneumatic source for supplying a flow of air entrained agricultural product from a product hopper to be applied by a utilization implement to an agricultural field. The air cart includes: a metering device for supplying product from the hopper to a product conveyance tube; an elongated drop chute of generally rectangular cross-sectional configuration having a front wall, a rear wall, and first and second sidewalls extending downwardly from the metering device to the product conveyance tube, the drop chute cross-sectional configuration having a varying width between the first and second sidewalls beginning near the metering device and diminishing to an intermediate lesser width which continues downwardly to an abrupt increase in width near the product conveyance tube, the abrupt increase followed by a gradual further increase in width formed by an arcuate region extending downwardly and terminating adjacent to the product conveyance tube; and a protective wear cover in contact with an interior portion of the elongated drop chute.

In another aspect, the present invention provides an air cart having, a pneumatic source for supplying a flow of air entrained agricultural product downstream in a conveyance tube from a product hopper to be applied by a utilization implement to an agricultural field. The air cart includes: a metering device for supplying product from the hopper to the product conveyance tube; an elongated drop chute of a variable generally rectangular cross-sectional configuration having a front wall, a rear wall, an upstream sidewall and a downstream sidewall extending downwardly from the metering device to the product conveyance tube, the rear wall and upstream sidewall remaining essentially flat from the metering device to the product conveyance tube, the downstream sidewall having an inward sloping region reducing the drop chute width beginning closely adjacent the metering device and continuing down about one-third the way from the metering device to the conveyance tube, and an abrupt corner causing an increase in drop chute width near the product conveyance tube followed by a curved region creating a gradual further increase in width formed by an arcuate region extending downwardly and terminating adjacent to the product delivery tube; and a protective wear cover in contact with an interior portion of the elongated drop chute.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
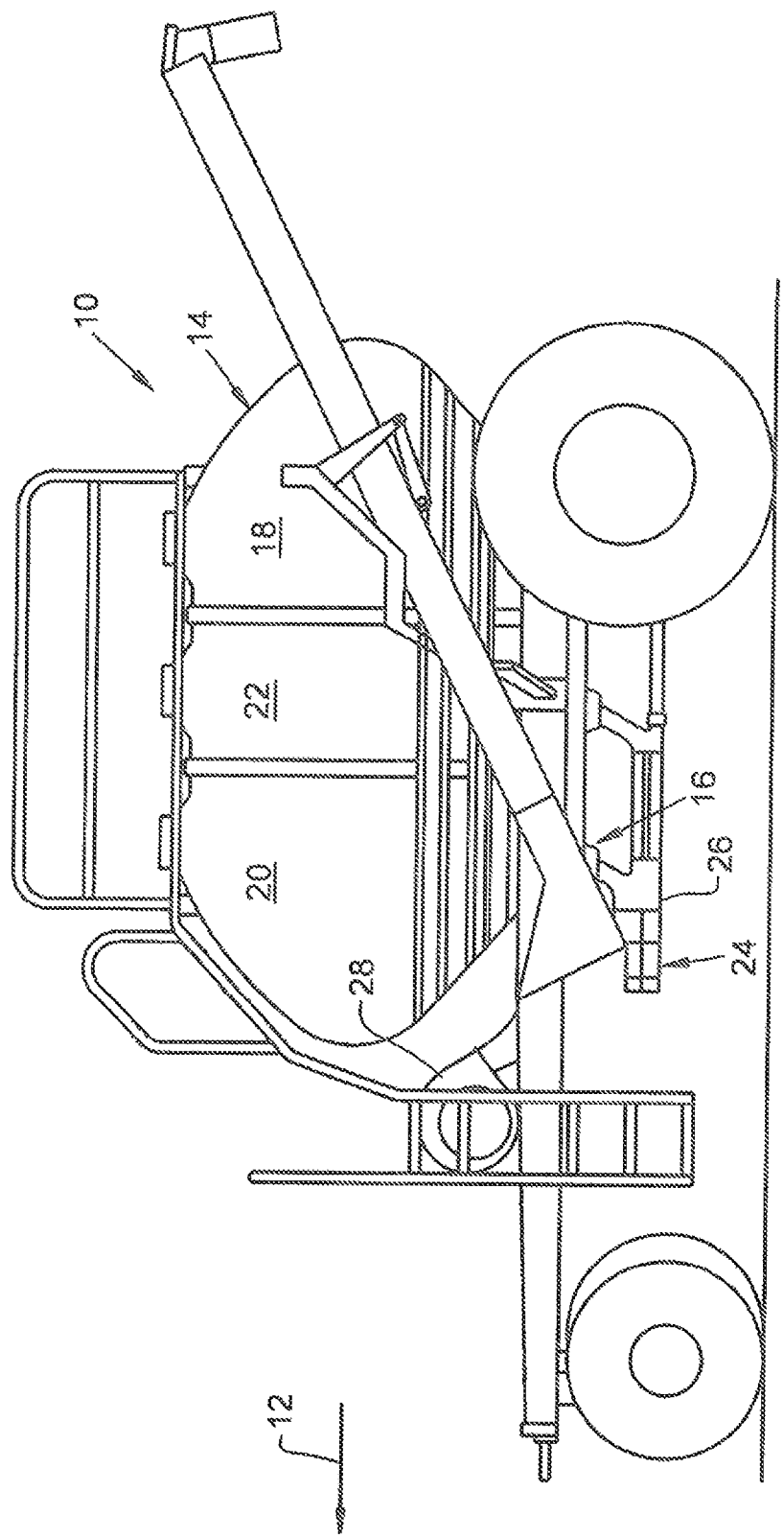
FIG. 1 is a side view of cart which may form part of an air seeder system and may include a metering box drop chute and protective wear cover of the present invention.

Referring now to the drawings, and more particularly to FIG. 1, there is shown an air cart comprising a portion of a pneumatic agricultural product delivery system which generally includes a traction unit (not shown) for towing air cart 10 in the direction of arrow 12. The system usually includes as a third unit, a utilization implement such as an air drill (not shown) for a seeding, cultivating and/or fertilizing operation. Air carts can be tow-between or tow-behind. A tow-between cart has the advantage of the drill being the last implement over the field and does not leave prints behind. A tow-behind cart has the advantage of the drill being closer to the tractor for improved viewing of the seeding operation. As is known in the art, the air cart 10 has a large hopper 14 that holds a quantity of particulate matter, e.g., seed and/or fertilizer and a metering unit 16 that meters the particulate matter from the tank or hopper 14 to the air drill. The hopper 14 may comprise a single compartment or several compartments, such as 18, 20, and 22. Multiple compartments provide the option of performing multiple operations, e.g., seeding and fertilizer application in a single pass. In addition to being mechanically linked with the air drill, the air cart 10 and the air drill are interconnected by air/product hoses such as the distribution lines 24. Air is supplied to the hoses via a manifold 26 or venturis by a pneumatic source such as a blower assembly 28 sometimes mounted adjacent the front of the hopper 14 and near the metering unit 16. Alternately, the blower assembly 28 may be mounted rearward of the hopper or adjacent a side of the hopper. As known in the art, the blower creates a turbulent air flow that forces the particulate matter metered by metering unit 16 into and along air/product hose 24 to the utilization implement for applying the air entrained product to an agricultural field. A drop chute couples the metering device and one or more product conveyance tubes. The prior art drop chutes are typically short and generally have a rectangular cross-sectional area for the majority of the height of the drop chute for both upper and lower product conveyance tubes.

Figure 2:
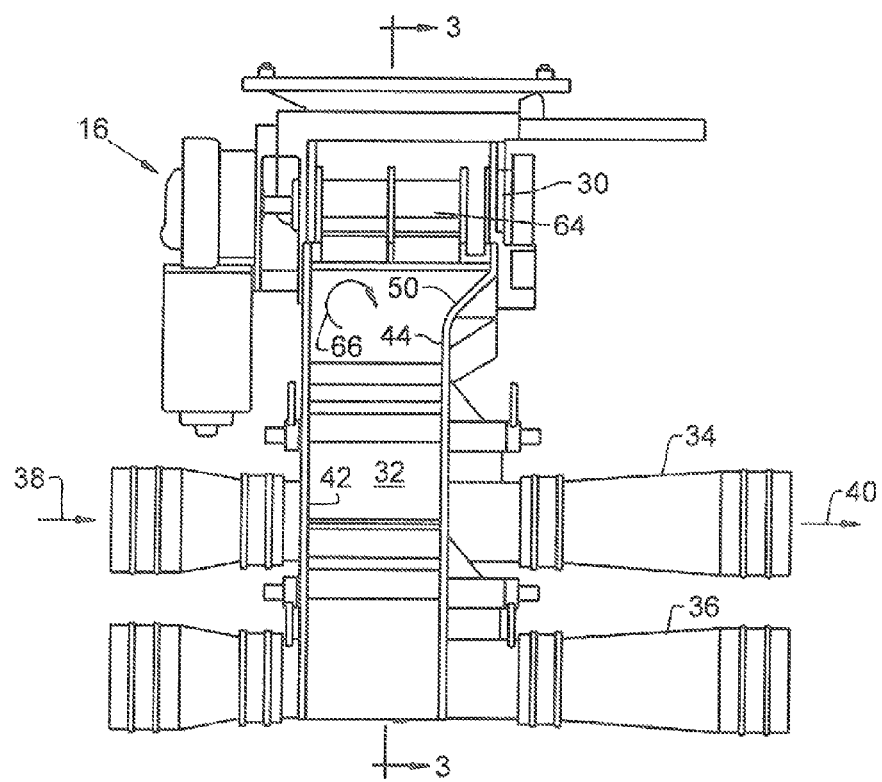
FIG. 2 is a cross-sectional view of the metering box drop chute of FIG. 1 as viewed from the rear wall of the metering box.
Figure 3:
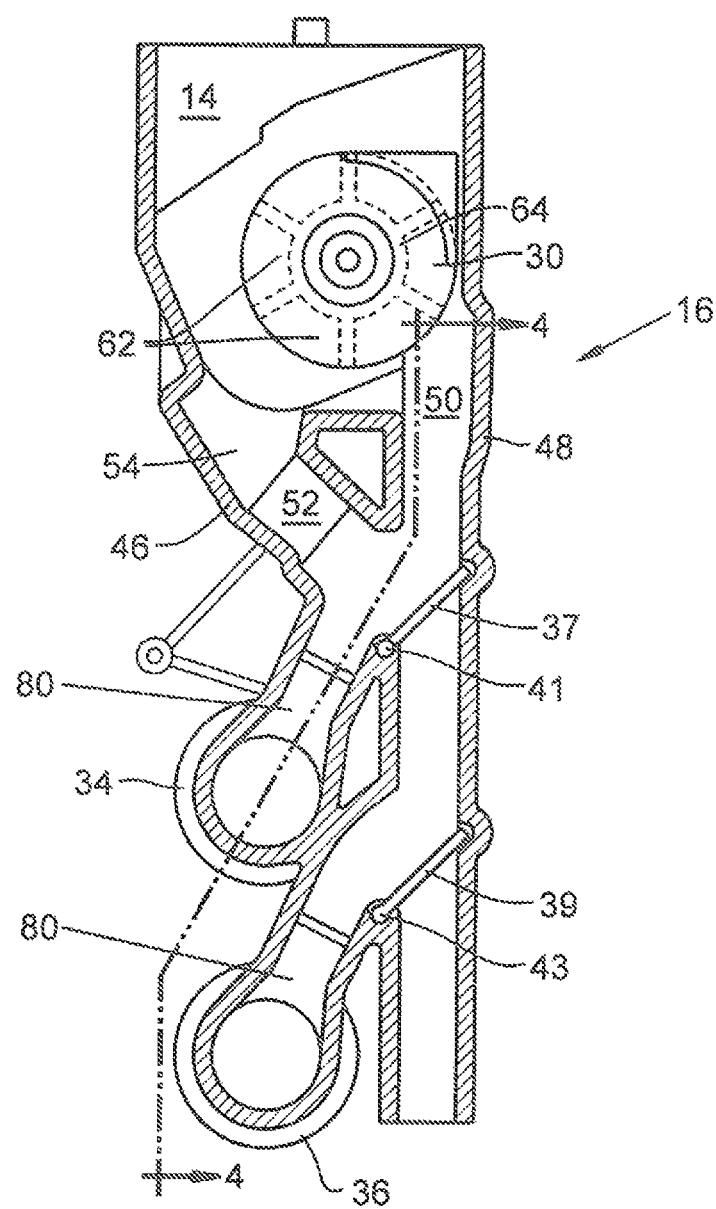
FIG. 3 is a cross-sectional view along lines 3-3 of FIG. 2 illustrating a metering device, drop chute, product conveyance tubes and protective wear cover.

FIG. 2 illustrates the metering box 16 comprising a metering device 30, drop chute 32 and product conveyance tubes 34, and 36 in cross-section as viewed from a rear wall of the drop chute. FIG. 3 is a cross-sectional view along lines 3-3 of FIGS. 2 and 4. FIG. 3 shows, the selection gates 37 and 39 in their inclined positions so that product is delivered to the upper conveyance tube 34. Both gates are shown in approximately a 2 o'clock position and either can be pivoted counter-clockwise about its respective pivot point 41 or 43 to a 12 o'clock position. The upper gate 37 can be pivoted further counter-clockwise to a 10 o'clock position to completely close off conveyance tube 34. Air flow from a pneumatic source such as the blower assembly 28 is shown by arrow 38 entering the metering box via conveyance tube 34 while arrow 40 indicates an exiting air entrained flow of particulate matter. Drop chute 32 is formed by an upstream sidewall 42, a downstream sidewall 44, and front and rear walls 46 and 48, respectively (FIG. 3). There is an inwardly sloping region 50 which functions to reduce the drop chute width beginning closely adjacent the metering device 30 as shown by W1 in FIG. 4 and continuing downwardly about one-third the way from the metering device to the conveyance tube 34 as shown at W2. Thereafter, the width remains essentially constant down to W3. The slope functions to funnel product to the mid position of the meter box. As seen in FIG. 3, a similar slope 52 is applied to the downstream side of the drain chute 54 to facilitate product drainage.

Figure 4:
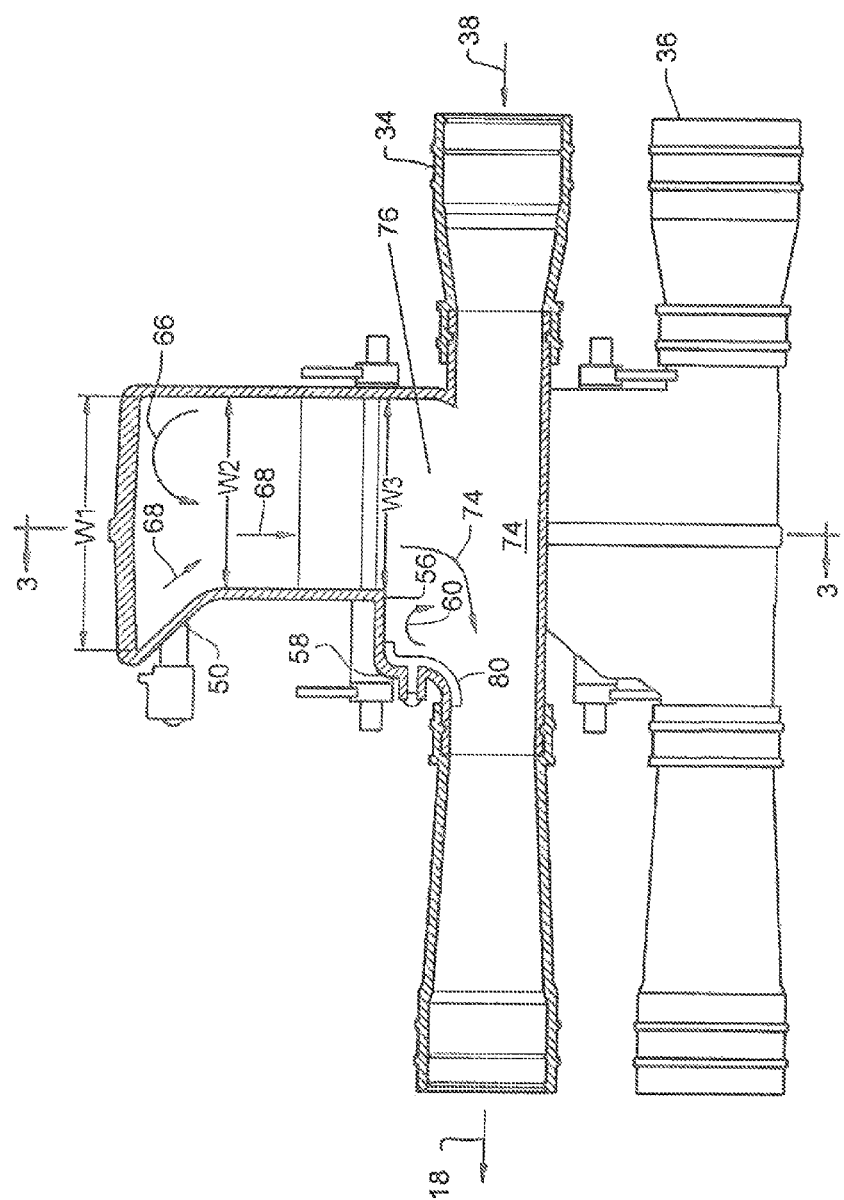
FIG. 4 is a partial cross-sectional view along lines 4-4 of FIG. 3.

FIG. 4 is a cross-sectional view along lines 4-4 of FIG. 3 and shows the abrupt corner 56 which creates an increase in drop chute width near the product conveyance tube followed by a curved or arcuate region 58 creating a gradual further increase in width terminating adjacent to the product delivery tube. The corner and curved region create the small strong vortex 60 aids the product flow from the meter roller 64 to transition into the air stream following a path approximated by arrow 72. The curved region 58 has a radius of curvature about half the diameter of the product conveyance tube.

In operation, product such as seed in hopper 14 is conveyed by wedge-shaped pockets 62 in the meter roller 64 to the drop chute near the slope 50 and flows along the downstream side of the large vortex 66, as indicated by arrows 68 and 70, in an interior portion 76 of the drop chute. This large, slow-moving, weak vortex 66 in the main drop chute rotates clockwise as viewed looking through the vertical rear wall 48 as in FIG. 2 and counter-clockwise as viewed from the front wall as in FIG. 4. The vortex 66 allows large and small product to fall naturally without having a significant upwards force, upon it. Product continues downward as shown by arrow 72 to near the abrupt corner 56 where the small high speed clockwise vortex 60 serves to entrain product exiting the drop chute and accelerate it in a circular motion, changing the product's trajectory from vertically downwards to horizontal as it is propelled via airflow through the venturi portion 74 of the product conveyance tube 34. A weak vortex may be present in the drain chute zone which has a minimal impact on the overall product flow with the downstream sidewall geometry. To obtain optimal product flow conditions and rates there should be a minimal (near zero) pressure differential between the area above the entire meter box (in the hopper) and in the product conveyance tube being used. However, the pressure in the hopper should not be lower than that in the product conveyance tube.

Figure 5:
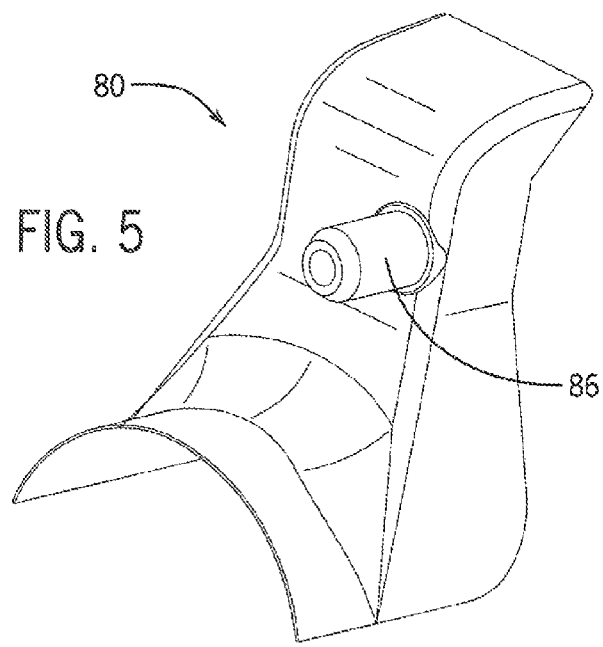
FIG. 5 is an isometric view of the protective wear cover of FIGS. 3-5.

As product continues downward as shown by arrow 72, a substantial portion of product may impact the housing of the metering device 30 at a surface area 78. Over time, this could potentially cause a hole to wear through the metering device, particularly if frequently using more abrasive, denser product, such as phosphorus fertilizer or rice, unless protected according to the present invention. With additional reference to FIG. 5, to protect the housing, and in particular, the surface area 78 of the housing, a protective wear cover 80 may be installed with respect to the metering device 30. In one aspect, the protective wear cover 80 may be installed inside the metering, device 30 so that it is in direct contact with the interior portion 76 of the drop chute at the surface area 78. For example, the protective wear cover 80 may be in contact with the arcuate region 58 as it creates the gradual further increase in width terminating adjacent to the product delivery tube. Moreover, the protective wear cover 80 may extend slightly into an upper portion of the product delivery tube. Accordingly, the protective wear cover 80 may be shaped to conform to the metering device 30 to ensure a tight fit and negligible effect on air flow.

The protective wear cover may be manufactured from a wear resistant, softer and more flexible material than the metering device 30, such as polyurethane. This may allow for providing cushioning for the product upon impact near the surface area 78, which may thereby reduce the likelihood of damage, breakage and/or scarring of product prior to delivery to the ground.

Figure 6:
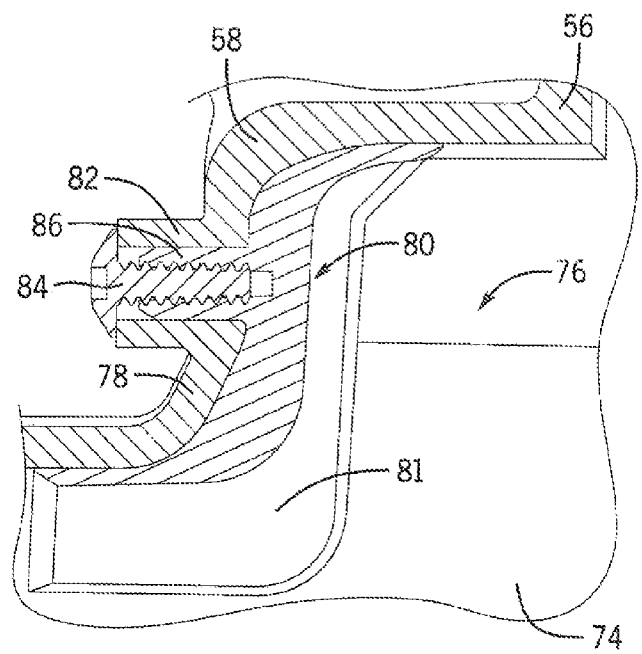
FIG. 6 is a partial cross-sectional view along lines 4-4 of FIG. 3 illustrating detail of the protective wear cover according to an aspect of the present invention.

Referring also to FIG. 6, in one aspect, the elongated drop chute may include a port or boss 82 for receiving a fastener 84, such as a bolt or screw. Also, the protective wear cover 80 may include a fastener housing 86 which may be in communication with the boss 82. Upon installation of the protective wear cover 80, the fastener housing 86 may be installed in the boss 82, and a fastener may be received through the boss 82 and the fastener housing 86, to securely hold the protective wear cover 80 to the interior portion 76 of the elongated drop chute. Other aspects may provide additional and/or alternative mechanisms for securely holding the protective wear cover 80 in place, such as adhesives, clips, detents, and the like. Such mechanisms are deemed within the scope of the invention.

The protective wear cover 80 may also include a texture or contours 81 on an interior surface of the protective wear cover 80. Such contours 81 may be provided to enhance the aerodynamic properties of the drop chute and the flow of product through the conveyance tube.

Figure 7:
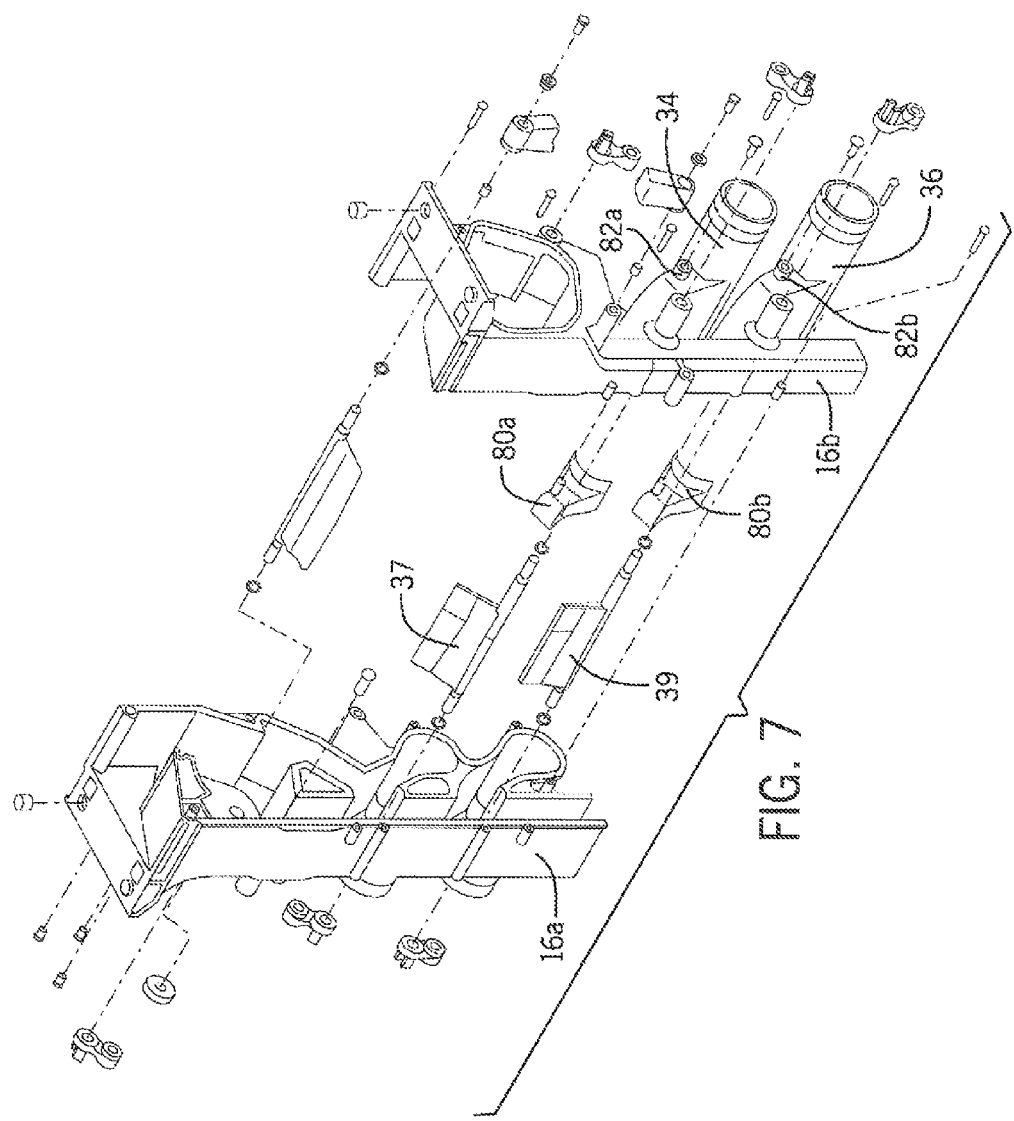
FIG. 7 is an exploded view of a metering box having a metering device and protective wear covers according to an aspect of the present invention.

In one aspect, the protective wear cover 80 may be installed during manufacture of the metering unit 16 or installed/replaced upon extensive disassembly and reassembly of the metering unit 16. Referring to FIG. 7, an exploded view of the metering unit 16 having a metering device 30 and protective wear covers 80 is provided according to an aspect of the present invention. The metering unit 16 may include a first metering unit half 16a having the upstream sidewall 42, and a second metering unit half 16b having, the downstream sidewall 44. The first metering unit half 16a may be joined together with the second metering unit half 16b via fasteners, adhesives, clips and the like. In between the first metering unit half 16a and the second metering unit half 16b, a first and second protective wear covers 80a and 80b, respectively, may be disposed for protecting the metering unit 16 from product flow. For example, the first protective wear covers 80a may be positioned interior to the metering unit 16 adjacent to an upper area of the second metering unit half 16b and extending slightly into the upper conveyance tube 34. This may provide protection for the metering unit 16 for product directed to the upper conveyance tube 34. Similarly, the second, protective wear covers 80b may be positioned interior to the metering unit 16 adjacent to a lower area of the second metering unit half 16b and, extending slightly into the lower conveyance tube 36. This may provide protection for the metering unit 16 for product directed to the lower conveyance tube 36.

In another aspect, the protective wear cover 80 could be installed, or replaced in the field, after the metering unit 16 has already been manufactured, without extensive disassembly and reassembly. To remove the protective wear cover 80, a tool, such as a screwdriver, may be used to remove the fastener 84. The same tool or a different tool may then be applied through the boss 82 to push the fastener housing 86 and, in turn, the protective wear cover 80, away from the with the arcuate region and down into the interior portion 76 of the drop chute. The protective wear cover 80 may then be retrieved through the conveyance tube. To install the protective wear cover 80 (or replace with a new protective wear cover 80), the protective wear cover 80 may be inserted through the conveyance tube and lifted upward so that the fastener housing 86 is installed in the boss 82. The fastener 84 may then be applied to securely hold the protective wear cover 80 to the arcuate region of the metering unit 16.

Accordingly, the protective wear cover 80 may therefore serve as a sacrificial barrier which prevents wear on the metering device 30. The protective wear cover 80 could be periodically replaced when worn. Replacing the protective wear cover 80 may advantageously negate the need to replace the whole metering device 30.

Although the best mode contemplated by the inventors of carrying out the present invention is disclosed above, practice of the above, invention is not limited thereto. It will be manifest that various additions, modifications and rearrangements of the features of the present invention may be made without deviating from the spirit and the scope of the underlying inventive concept.

What is claimed is:

1. A pneumatic agricultural product delivery system, comprising:
   at least one product supply hopper;
   a pneumatic source;
   at least one product conveyance tube receiving air flow from the pneumatic source for supplying air entrained product to a utilization implement;
   a metering device for supplying product from the supply hopper to a product conveyance tube;
   an elongated drop chute of generally rectangular cross-sectional configuration having a front wall, a rear wall, and first and second sidewalls extending downwardly from the metering device to the product conveyance tube, the chop chute cross-sectional configuration having a varying width between the first and second sidewalls beginning near the metering device and diminishing to an intermediate lesser width which continues downwardly to an abrupt increase in width near the product conveyance tube, the abrupt increase followed by a gradual further increase in width formed by an arcuate region extending downwardly and terminating adjacent to the product delivery tube; and a protective wear cover in contact with an interior portion of the elongated drop chute.

2. The pneumatic agricultural product delivery system of claim 1, wherein the protective wear cover is in contact with the arcuate region extending downwardly.

3. The pneumatic agricultural product delivery system of claim 1, wherein the elongated drop chute includes a boss for receiving a fastener, and wherein the protective wear cover includes a fastener housing in communication with the boss.

4. The pneumatic agricultural product delivery system of claim 3, further comprising a screw installed in the boss and the fastener housing, wherein the screw securely holds the protective wear cover to the interior portion of the elongated drop chute.

5. The pneumatic agricultural product delivery system of claim 1, wherein the protective wear cover is manufactured from polyurethane.

6. The pneumatic agricultural product delivery system of claim 1, wherein the intermediate width becomes essentially constant beginning about one-third the way from the metering device to the conveyance tube.

7. The pneumatic agricultural product delivery system of claim 1, wherein the product conveyance tube is of a generally hollow cylindrical cross-section and the intermediate width increases abruptly at a distance approximately one-half the outer diameter of the product conveyance tube from the tube.

8. The pneumatic agricultural product delivery system of claim 1, wherein the gradual further increase in width causes a small strong vortex to be formed adjacent thereto for accelerating product in a circular motion to facilitate the direction change from vertically downward to horizontal through the product conveyance tube.

9. The pneumatic agricultural product delivery system of claim 1, wherein the varying width beginning near the metering device induces a large low-speed vortex below the metering device and functions to funnel product toward the center of the metering device.

10. An air cart having a pneumatic source for supplying a flow of air entrained agricultural product from a product hopper to be applied by a utilization implement to an agricultural field, including:

a metering device for supplying product from the hopper to a product conveyance tube;

an elongated drop chute of generally rectangular cross-sectional configuration having a front wall, a rear wall, and first and second sidewalls extending downwardly from the metering device to the product conveyance tube, the drop chute cross-sectional configuration having a varying width between the first and second sidewalls beginning near the metering device and diminishing to an intermediate lesser width which continues downwardly to an abrupt increase in width near the product conveyance tube, the abrupt increase followed by a gradual further increase in width formed by an arcuate region extending downwardly and terminating adjacent to the product conveyance tube; and a protective wear cover in contact with an interior portion of the elongated drop chute.

11. The air cart of claim 10, wherein the protective wear cover is in contact with the arcuate region extending downwardly.

12. The air cart of claim 10, wherein the elongated drop chute includes a boss for receiving a fastener, and wherein the protective wear cover includes a fastener housing in communication with the boss.

13. The air cart of claim 12, further comprising a screw installed in the boss and the fastener housing, wherein the screw securely holds the protective wear cover to the interior portion of the elongated drop chute.

14. The air cart of claim 10, wherein the protective wear cover is manufactured from polyurethane.

15. An air cart having a pneumatic source for supplying a flow of air entrained agricultural product downstream in a conveyance tube from a product hopper to be applied by a utilization implement to an agricultural field, including:

a metering device for supplying product from the hopper to the product conveyance tube;

an elongated drop chute of a variable generally rectangular cross-sectional configuration having a front wall, a rear wall, an upstream sidewall and a downstream sidewall extending downwardly from the metering device to the product conveyance tube, the rear wall and upstream sidewall remaining essentially flat from the metering device to the product conveyance tube, the downstream sidewall having an inward sloping region reducing the drop chute width beginning closely adjacent the metering device and continuing down about one-third the way from the metering device to the conveyance tube, and an abrupt corner causing an increase in drop chute width near the product conveyance tube followed by a curved region creating a gradual further increase in width formed by an arcuate region extending downwardly and terminating adjacent to the product delivery tube; and a protective wear cover in contact with an interior portion of the elongated drop chute.

16. The air cart of claim 15, wherein the protective wear cover is in contact with the arcuate region extending downwardly.

17. The air cart of claim 15, wherein the elongated drop chute includes a boss for receiving a fastener, and wherein the protective wear cover includes, a fastener housing in communication with the boss.

18. The air cart of claim 17, further comprising a screw installed in the boss and the fastener housing, wherein the screw securely holds the protective wear cover to the interior portion of the elongated drop chute.

19. The air cart of claim 15, wherein the protective wear cover is manufactured from polyurethane.

20. The pneumatic agricultural product deli very system of claim 1, wherein the rear wall and one sidewall remain essentially flat from the metering device to the product conveyance tube.

* * * * *